(12) United States Patent
Kohout et al.

(10) Patent No.: US 7,710,089 B2
(45) Date of Patent: May 4, 2010

(54) AUTOMATIC CONFIGURATION FOR LINEAR MODE OF SWITCHING POWER SUPPLY

(75) Inventors: James Allen Kohout, Dallas, TX (US); John H Carpenter, Jr., Rowlett, TX (US); Brett Jason Thompsen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 365 days.

(21) Appl. No.: 11/681,758

(22) Filed: Mar. 3, 2007

(65) Prior Publication Data
US 2007/0210773 A1 Sep. 13, 2007

Related U.S. Application Data

(60) Provisional application No. 60/779,952, filed on Mar. 6, 2006.

(51) Int. Cl.
G05F 1/56 (2006.01)
G05F 1/59 (2006.01)
(52) U.S. Cl. .................... 323/273; 323/282; 323/901
(58) Field of Classification Search ........... 323/268, 323/271, 273–275, 282–287, 901
See application file for complete search history.

(56) References Cited

U.S. PATENT DOCUMENTS 5,773,966 A * 6/1998 Steigerwald ............... 323/284
6,229,289 B1 * 5/2001 Piovaccari et al. .......... 323/268
6,452,368 B1 * 9/2002 Basso et al. ................ 323/282
7,129,681 B2 * 10/2006 Fujii ........................ 323/268
7,508,176 B2 * 3/2009 Hartular et al. ............. 323/268
2007/0279024 A1 * 12/2007 Falvey et al. ............... 323/280

OTHER PUBLICATIONS

"Designing With the TPS54610 Synchronous Buck Converter," Application Report, Feb. 2002, pp. 1-13 (Brian M. King).
"2A Step Down Switching Regulator," L4978, May 2005, pp. 1-13.

* cited by examiner

Primary Examiner—Jeffrey L Sterrett
Assistant Examiner—Fred E Finch, III
(74) Attorney, Agent, or Firm—William B. Kempler; Wade J. Brady, III; Frederick J. Telecky, Jr.

(57) ABSTRACT

A method and apparatus for a Regulator that automatically configures to work in either SMPS mode or linear mode are disclosed. In one embodiment, the method includes inputting a constant current source to a CBoot_pin for a first predetermined amount of time upon enabling an autodetect circuit by a Regulator control circuit. The CBoot voltage at the CBoot_pin is then determined to see if the CBBoot voltage at the CBoot_pin is above a predetermined CBoot voltage for a second predetermined amount of time. The Regulator is then switched to operate in SMPS mode if the CBoot voltage is substantially continuously above the predetermined CBoot voltage for a second predetermined amount of time. The SMPS is operated in linear mode if the CBoot voltage is substantially continuously below or equal to the predetermined CBoot voltage for a second predetermined amount of time.

20 Claims, 4 Drawing Sheets

AUTOMATIC CONFIGURATION FOR LINEAR MODE OF SWITCHING POWER SUPPLY

This application claims priority under 35 USC §119 (e) (1) of provisional application No. 60/779,952, Filed on Mar. 6, 2006.

FIELD OF TECHNOLOGY

This disclosure relates generally to power supplies, and more particularly, to power supplies that can automatically supply power efficiently to high and low power applications.

BACKGROUND

As integrated circuit (IC) and system designs are getting more complex, so do the supply current requirements. To handle such requirements, high current switch mode power supply (SMPS) designs are typically used. The SMPS is very often integrated into the same die as sensitive analog circuitry. While the SMPS greatly benefits the power dissipation of the device, the high current switching can also induce unwanted noise that can be detrimental to normal operation of sensitive circuits, both on and off the IC, as well as radiated and conducted emissions produced by the SMPS.

Thus, in systems using a highly specialized application specific integrated circuit (ASIC) and where such high current is not required, it is generally advantageous to use a standard linear Regulator instead of using the high current SMPS topology. While using the standard linear Regulator increases the power dissipation, it also greatly reduces the noise induced from the high frequency switching of the SMPS topology. Further, it is desirable to use the same power supply for both high and low power applications.

One current technique that uses the power supply for both the low and high power applications requires programming the Regulator circuit during a final test, which could be via a fuse, EEPROM, or a metal mask change. Another current technique that uses the same power supply for both the low and high power applications requires an additional external pin in the Regulator topology to facilitate selection of the desire mode. All of these solutions either require separate part numbers for the EEPROM, fuse, or a different IC for the metal mask change solution. The use of an external pin for selection of low and high power applications may not be an option available, especially when the IC package is pin limited. Additionally, if the IC package/pin out needs to be backwards compatible with previous revisions, an addition of a pin and/or a change in the PCB layout may be may not be feasible or desirable.

SUMMARY

A method, apparatus and system for auto configuration of a Regulator circuit for linear mode or switching mode operation using an existing bootstrap capacitor of SMPS is disclosed. In one aspect, there is provided a method for automatically configuring a Regulator to work in either SMPS mode or linear mode, the method including the steps of inputting a predetermined amount of current to a CBoot_pin for a first predetermined amount of time upon enabling an autodetect circuit by a Regulator control circuit, determining whether a CBoot voltage at the CBoot_pin is substantially continuously above a predetermined CBoot voltage for a second predetermined amount of time, and either switching the Regulator in SMPS mode or operating the Regulator in linear mode by shorting the CBoot_pin to ground based on the outcome of the determination.

BRIEF DESCRIPTION OF THE DRAWINGS

Example embodiments are illustrated by way of example and not limitation in the figures of the accompanying drawings, in which like references indicate similar elements and in which.

DETAILED DESCRIPTION

A method and apparatus for a Regulator that automatically configures to work in either SMPS mode or linear mode are disclosed. In the following description, for purposes of explanation, numerous specific details are set forth in order to provide a thorough understanding of the various embodiments. It will be evident, however, to one skilled in the art that the various embodiments may be practiced without these specific details.

The terms "SMPS_Mode_Detect" and "SMPS_Mode_Detect_signal" are used interchangeably throughout the document. The terms "SMPS" and "Regulator" are used interchangeably throughout the document.

Figure 1:
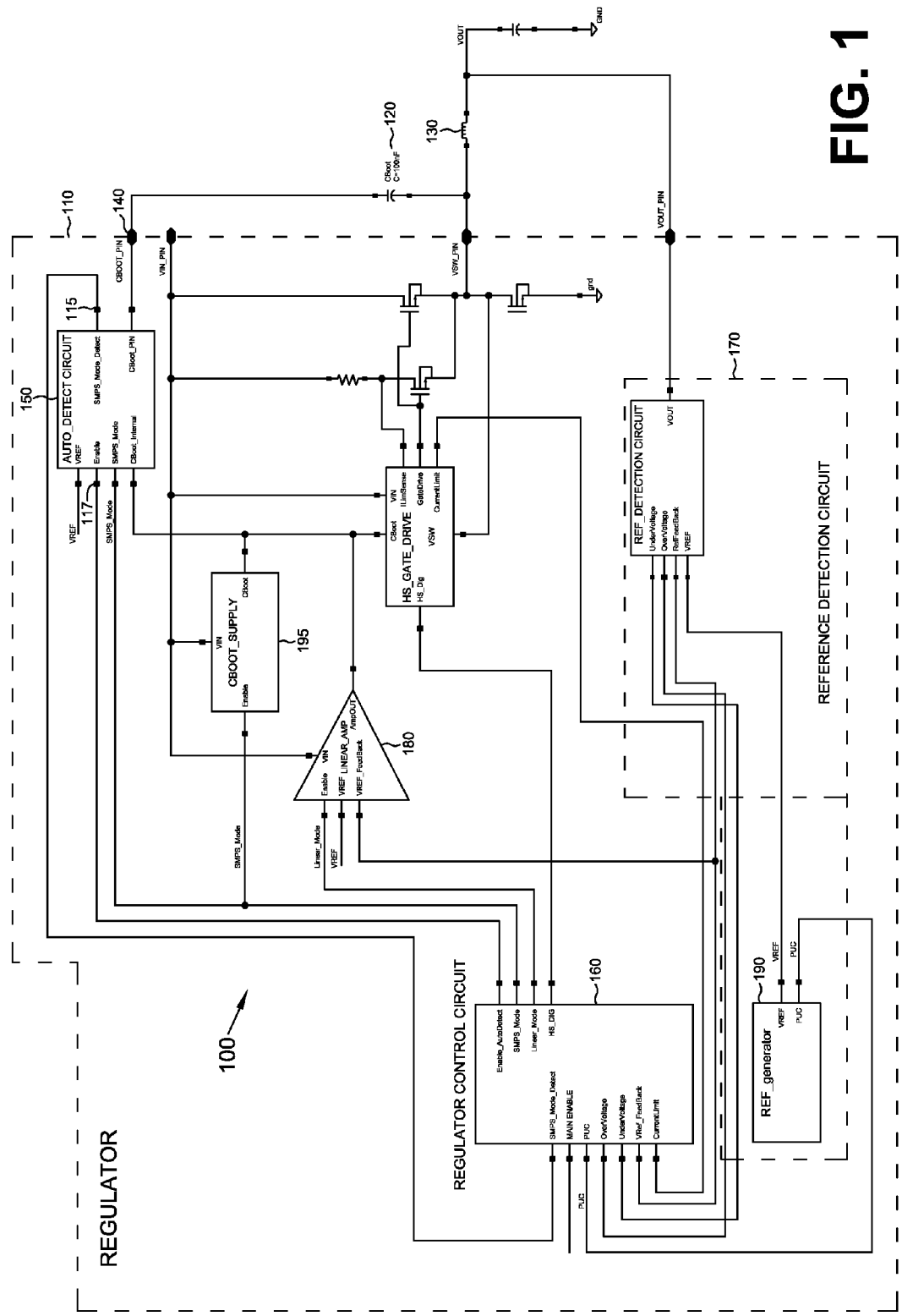
FIG. 1 illustrates a block diagram of a Regulator in SMPS mode, according to one embodiment.

In one embodiment, the block diagram 100 in FIG. 1 shows a Regulator 110 operating in SMPS mode. As shown in FIG. 1, the block diagram 100 includes a regulator 110, a CBoot capacitor 120, and an external inductor 130. In this embodiment, the Regulator 110 is coupled to the CBoot capacitor 120. The external inductor 130 is coupled between the CBoot capacitor 120 and the Vout Capacitor. Further as shown in FIG. 1, the Regulator 110 includes an autodetect circuit 150, a CBoot_pin 140, a Regulator control circuit 160, and a reference detection circuit 170. As shown in FIG. 1, the CBoot_pin 140 is connected between the autodetect circuit 150 and the CBoot capacitor 120. Also as shown in FIG. 1, the Regulator control circuit 160 is coupled between the autodetect circuit 150 and the reference detection circuit 170. Also as shown in FIG. 1, the Regulator 110 includes a linear amp 180 that is connected between the Regulator control circuit 160 and the autodetect circuit 150. The Regulator 110 shown in FIG. 1 further includes a REF_generator 190 that is coupled to the reference detection circuit 170.

In operation, the Regulator control circuit 160 enables the autodetect circuit 150. The autodetect circuit 150 then inputs a constant current into the CBoot_pin 140 using a current mirror 310 (shown in FIG. 3) for a first predetermined amount of time. In some embodiments, the Regulator control circuit 160 enables the autodetect circuit 150. The autodetect circuit then inputs a predetermined amount of current from the current mirror 310 (shown in FIG. 3).

The autodetect circuit 150 measures the CBoot voltage at the CBoot_pin 140 and determines whether the CBoot voltage is substantially continuously above a predetermined CBoot voltage for a second predetermined amount of time. In some embodiments, the second predetermined amount of time is substantially less than the first predetermined amount of time. The Regulator control circuit 160 enables the Regulator 110 to switch in SMPS mode or operate in linear mode based on the measured CBoot voltage. In the SMPS mode, the linear amplifier 180 is disabled and a CBoot_supply 195 is enabled.

In these embodiments, a REF_generator 190 generates a reference voltage and inputs the generated reference voltage into the autodetect circuit 150. The reference voltage is then compared with the measured CBoot voltage. The Regulator control circuit 160 enables the Regulator 110 to switch in SMPS mode or operate in the linear mode based on the outcome of the comparison.

Figure 2:
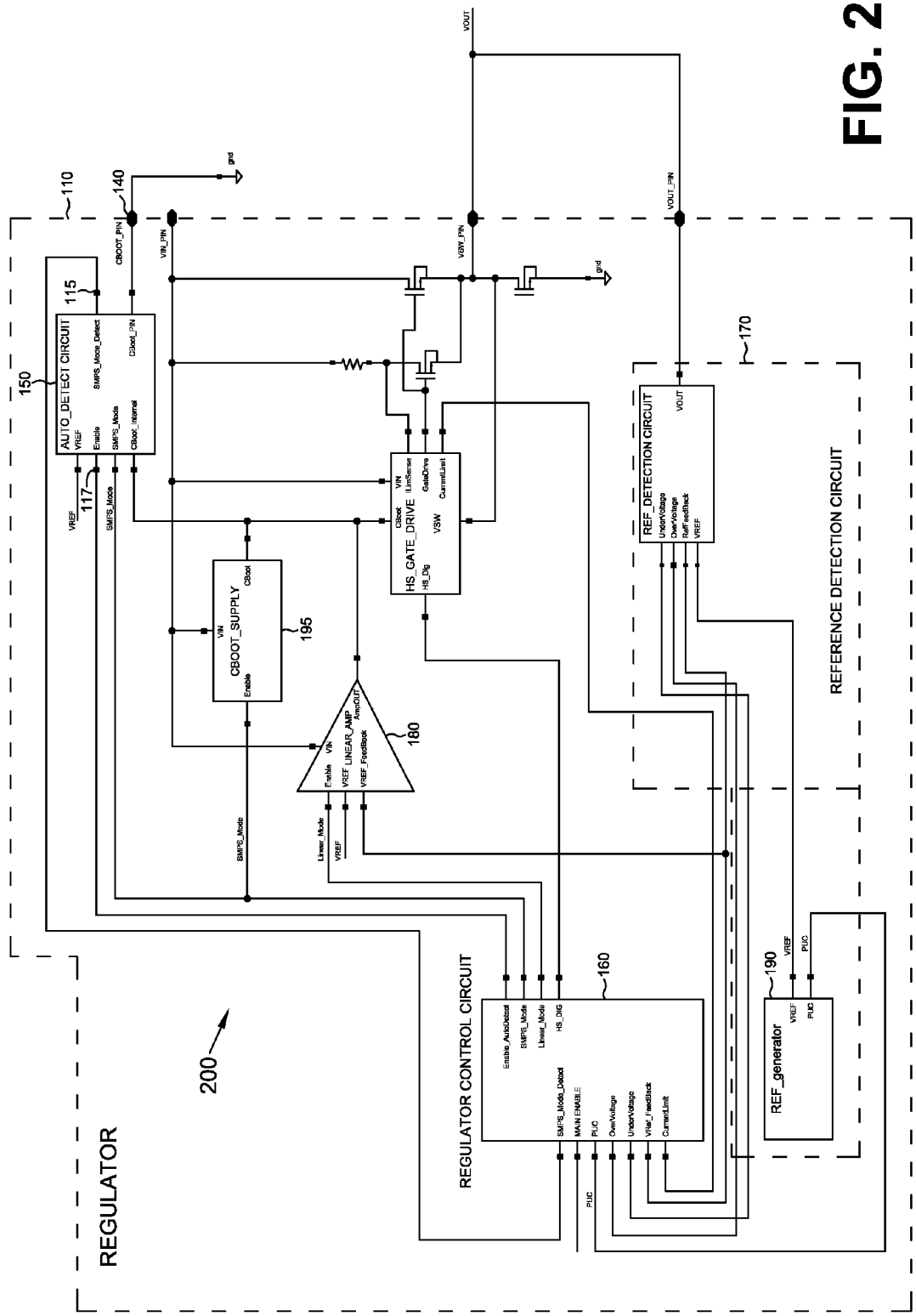
FIG. 2 illustrates a block diagram of a Regulator in linear mode, according to one embodiment.

In some embodiments, the autodetect circuit 150 outputs a SMPS_Mode_Detect signal based on the outcome of the comparison. The Regulator control circuit 160 then enables the Regulator 110 to operate in linear mode via the linear amp 190 upon receiving the corresponding SMPS_Mode_Detect signal (As shown in FIG. 2). Also in these embodiments, the Regulator control circuit 160 enables the Regulator 110 to operate in linear mode when the CBoot_pin 140 is shorted to ground via a GND terminal. The Regulator control circuit 160 enables the Regulator 110 to switch in SMPS mode upon receiving a high SMPS_Mode_Detect signal.

As shown in FIG. 2, the REF_generator 190 has a first output VREF to provide a reference signal to the reference detection circuit 170. The REF_generator 190 further has a second output PUC to provide an internal power-up-clear (PUC) signal to the Regulator control circuit 160.

FIG. 2 is an example block diagram of a Regulator 200 operating in linear mode. The block diagram shown in FIG. 2 is similar to the block diagram shown in FIG. 1 except that the Regulator 200 is configured to operate in linear mode. In this configuration, the CBoot capacitor 120 and the external inductor 130 shown in FIG. 1 are not included as they are not required to operate the Regulator 200 in the linear mode. Additionally, for the above auto-detection scheme to operate, the CBoot_pin 140 is connected to GND as shown in FIG. 2. In this configuration, when the Autodetect circuit 150 determines to operate in linear mode, the linear amp 180 is enabled and the CBoot_supply 195 is disabled.

Figure 3:
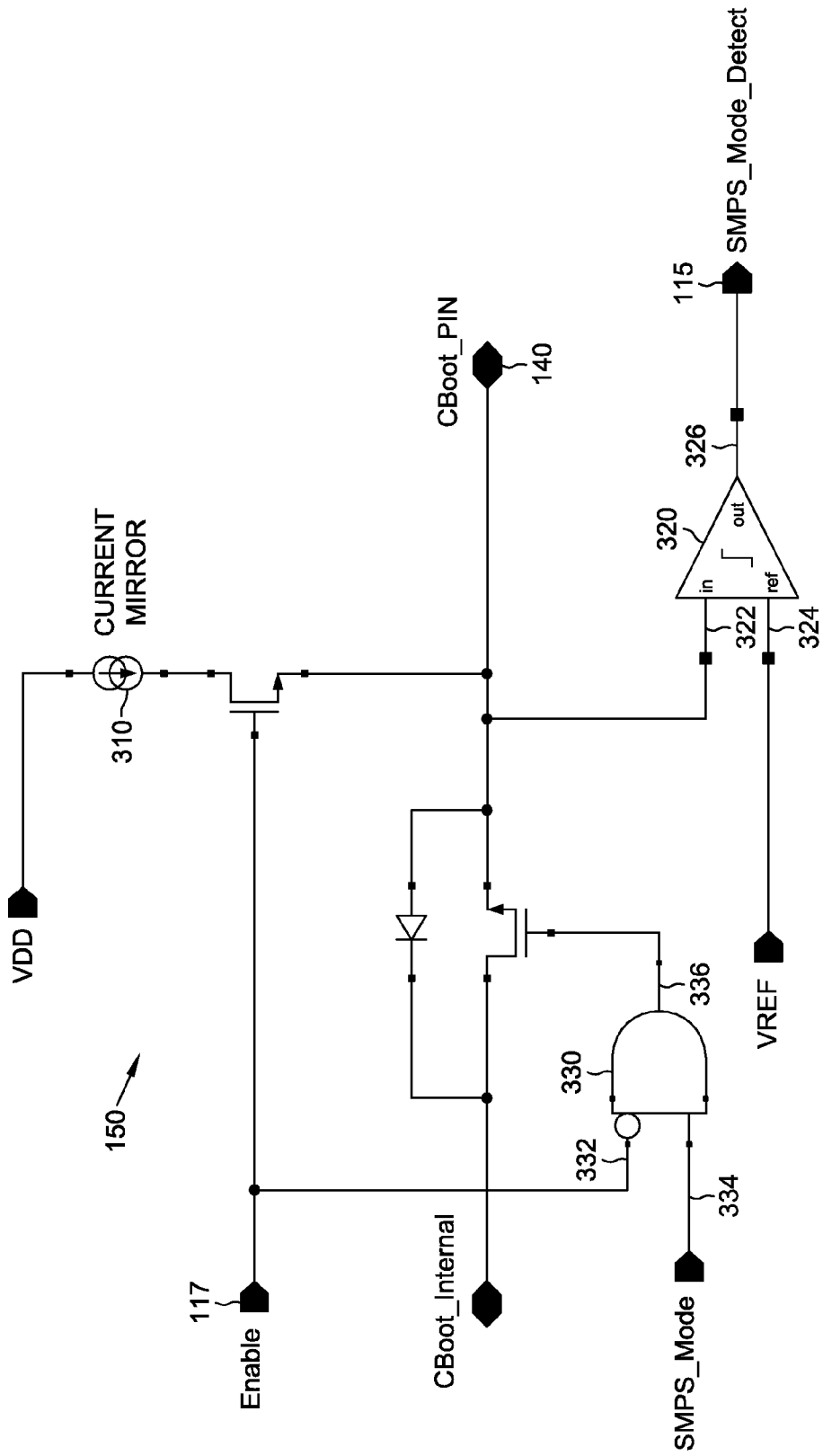
FIG. 3 illustrates a block diagram of autodetect circuit for determining switching mode or linear mode, according to one embodiment.

FIG. 3 is an example block diagram showing major components of the autodetect circuit 150. As shown in FIG. 3, the autodetect circuit 150 includes a current mirror 310 that is connected between a supply terminal VDD, and the CBoot_pin 140. Exemplary supply terminal is a 5V supply terminal. Further as shown in FIG. 3, the autodetect circuit 150 includes a comparator 320 and an AND gate 330. The comparator 320 is coupled between the Regulator control circuit 160 (shown in FIGS. 1 and 2) and the CBoot_pin 140. Also shown in FIG. 3, is the enable terminal 117 that connects to the associated enable terminal of the Regulator control circuit 160 (shown in FIGS. 1 and 2). Furthermore as shown in FIG. 3, is the SMPS_Mode_Detect terminal 115 that connects to the associated SMPS_Mode_Detect terminal of the SMPS circuit 160 (shown in FIGS. 1 and 2).

Further as shown in FIG. 3, the comparator 320 has a first input 322, a second input 324, and an output 326. The first input 322 of the comparator 320 is connected to the CBoot_pin 140 to receive the constant current from the 5V supply terminal VDD. The second input 324 of the comparator 320 is connected to receive the reference voltage from the REF_generator 190. The output 326 of the comparator 320 is connected to an associated SMPS_Mode_Detect terminal of the Regulator control circuit 160 (shown in FIGS. 1 and 2).

Furthermore as shown in FIG. 3, the AND gate 330 has a first input 332, a second input 334 and an output 336. The first input 332 of the AND gate 330 is coupled to receive the enable signal from the Regulator control circuit 160 (shown in FIGS. 1 and 2). The second input 334 of the AND gate 330 is coupled to receive the SMPS_Mode signal from the Regulator control circuit 160. The output 336 of the AND gate 330 is coupled to the CBoot_pin 140.

In operation, the comparator 320 receives the reference voltage from the REF_generator 190 at first input 322 and the CBoot voltage measured at CBoot_pin 140 at second input 324 and outputs a SMPS_Mode_Detect signal to the Regulator control circuit 160 (shown in FIGS. 1 and 2) based on the received reference voltage and the CBoot voltage. The Regulator control circuit 160 then enables the Regulator 110 (shown in FIGS. 1 and 2) to switch in SMPS mode or operate in linear mode based on the received SMPS_Mode_Detect signal.

Figure 4:
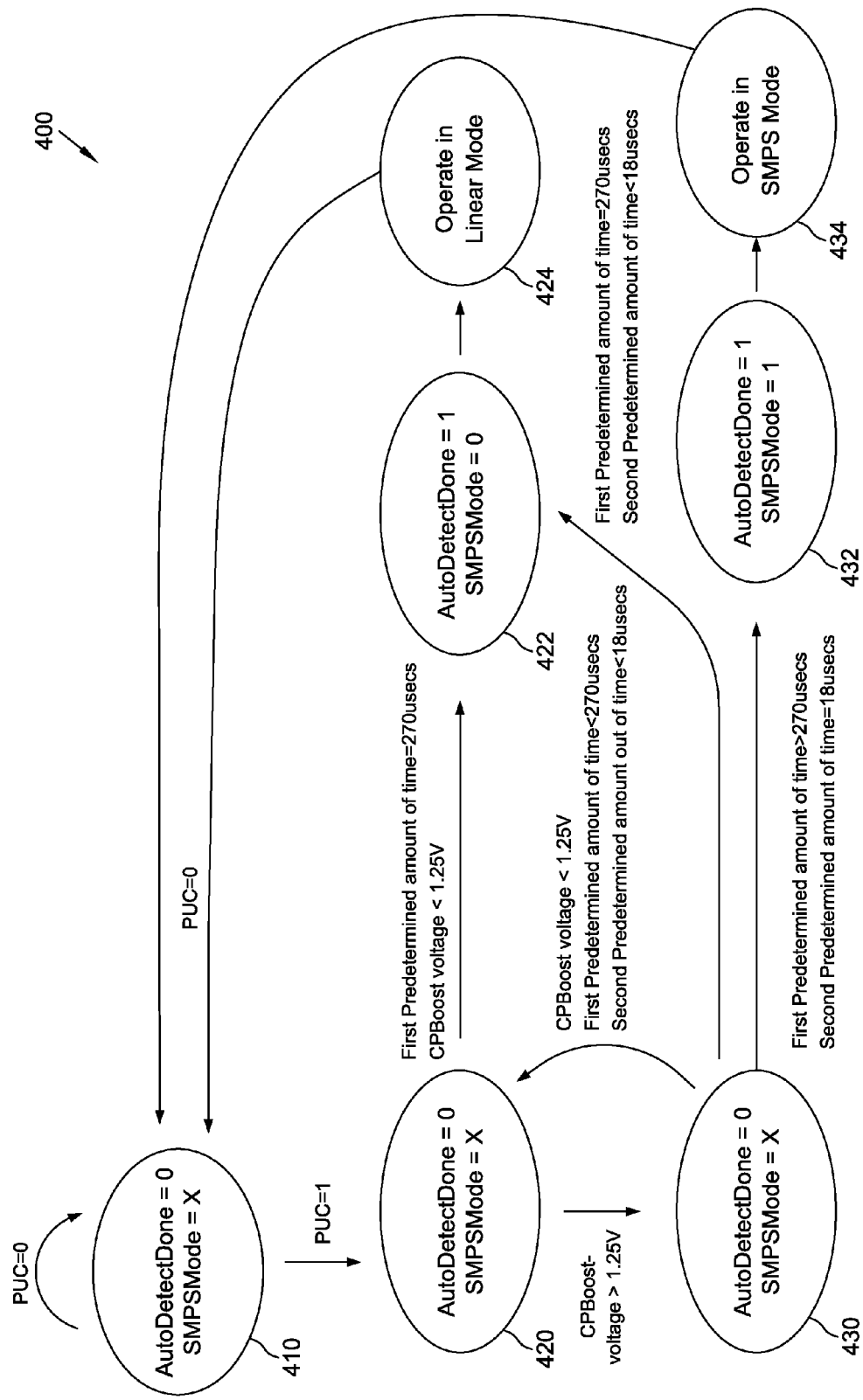
FIG. 4 illustrates Regulator autodetect mode state machine, according to one embodiment.

FIG. 4 illustrates an example SMPS autodetect mode state machine 400. The operation of the autodetect mode state machine 400 begins at 410 upon receiving an internal PUC signal from the Regulator control circuit and/or upon enabling the Regulator by a main enable signal coming from a main enable circuit. The CBoot_pin is then inputted with a predetermined amount of current for a predetermined amount of time upon enabling the autodetect circuit by the Regulator control circuit. In some embodiments, the CBoot_pin is inputted with a constant current source for a predetermined amount of time upon enabling the autodetect circuit by the Regulator control circuit.

At 420, the state machine 400 determines whether the CBoot voltage at CBoot_pin is above the predetermined CBoot voltage. Based on the determination at step 420, the state machine 400 goes to 430 if the measured CBoot voltage at CBoot_pin is above the predetermined CBoot voltage and enables the SMPS to switch in SMPS mode. Also at 430 the state machine 400 determines whether the CBoot voltage at CBoot_pin stays above the predetermined CBoot voltage for a period greater than a first predetermined amount of time and is equal to the second predetermined amount of time. Based on the determination at 430, the state machine 400 goes to 432 and maintains the SMPS to switch in SMPS mode.

Based on the determination at 420, the state machine 400 goes to 422 if the measured CBoot voltage at CBoot_pin is less than the predetermined CBoot voltage during the first predetermined amount of time and enables the linear amp to operate the Regulator in the linear mode at 424. As shown in FIG. 4, from either 434 or 424 (latched state) the state machine 400 goes to 410 upon occurrence of an internal PUC and repeats steps 410-434. In these embodiments, typically the internal PUC occurs due to a loss of power from a main battery supply. In some embodiments, the logic associated with above state machine 400 is included in the Regulator control circuitry.

In some embodiments, the predetermined CBoot voltage is approximately in the range of about 0.6 Volts-1.25 Volts. Also, in these embodiments, the first predetermined amount of time is approximately in the range of about 270 microseconds and the second predetermined amount of time is approximately in the range of about 18 microseconds. Further in these embodiments, the predetermined current source is approximately about one milliamp.

The above technique provides an automatic configuration linear or switching mode using the bootstrap capacitor which requires no programming at the application and/or IC level. In the above technique the same IC can be used in both modes and only the external bootstrap capacitor needs to be included based on the desired mode of operation. The above shown Regulator is drop-in compatible for use in both linear and/or switching mode.

The above technique places a constant current on the external bootstrap capacitor for a predetermined amount of time. On the contrary, the lack of external bootstrap capacitor will cause the CBoot_pin to go high. By using a comparator at the CBoot_pin the autodetect circuit will detect either a high or a low state of SMPS_Mode_Detect. A low state at the CBoot_pin will signal the Regulator to operate in linear mode. A high state at the CBoot_pin will signal the Regulator to operate in SMPS mode using the external bootstrap capacitor.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry).

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. An integrated circuit (IC), comprising:
   a CBoot_pin for providing a bootstrap voltage when a CBoot capacitor is coupled to the CBoot_pin;
   a regulator couplable to the CBoot capacitor via the CBoot_ pin, wherein the CBoot_pin connects to a current mirror, and wherein the regulator comprises:
     a regulator control circuit; and
     an autodetect circuit coupled to the regulator control circuit, wherein the autodetect circuit inputs a constant current to the CBoot capacitor via the CBoot_ pin using the current mirror and measures a CBoot voltage at the CBoot_pin, and wherein the regulator control circuit enables the regulator to make a one-time switch between an SMPS mode or a linear mode of operation based on the CBoot voltage.

2. The IC of claim 1, further comprising:
   a current mirror coupled to the CBoot_pin to provide the constant current to the CBoot_pin.

3. The IC of claim 1, further comprising:
   a REF_generator to generate a reference voltage, wherein the reference voltage is compared with the CBoot voltage and wherein the regulator control circuit enables the regulator to switch in the SMPS mode or operate in the linear mode based on the outcome of the comparison.

4. The IC of claim 3, wherein the autodetect circuit comprises:
   a comparator coupled between the regulator control circuit and the CBoot_pin, wherein the comparator receives the reference voltage and the CBoot voltage and outputs a SMPS_Mode_Detect signal to the regulator control circuit, and wherein the regulator control circuit enables the regulator to switch in the SMPS mode or operate in the linear mode based on the SMPS_Mode_Detect signal.

5. The IC of claim 4, wherein the comparator has a first input, a second input and an output, wherein the first input of the comparator is connected to CBoot_pin to receive constant current from the current mirror, the second input of the comparator is connected to receive the reference voltage from the REF_generator, and the output is connected to an associated SMPS_Mode_Detect terminal of the regulator control circuit.

6. The IC of claim 3, wherein the autodetect circuit further comprises:
   an AND gate having a first input, a second input, and an output, wherein the first input is coupled to receive an enable signal from the regulator control circuit, the second input is coupled to receive an SMPS_mode signal from the regulator control circuit and the output is coupled to the CBoot_pin.

7. The IC of claim 3, further comprising:
   a linear amp coupled to the regulator control circuit and wherein the regulator control circuit enables the regulator to operate in linear mode via the linear amp if the SMPS_Mode_Detect signal is low because the CBoot_ pin is shorted to ground.

8. The IC of claim 3, wherein the regulator control circuit enables the regulator to switch in the SMPS mode upon receiving a high SMPS_Mode_Detect signal.

9. The IC of claim 3, wherein the REF_generator is coupled to a reference detection circuit, wherein the REF_generator has a first output and a second output, wherein the first output to provide a VREF and the second output to provide an internal power-up-clear (PUC) signal, and wherein the first output of the REF_generator is connected to an associated VREF input terminal of the reference detection circuit.

10. A method for automatically configuring a regulator one-time to either work in SMPS mode or linear mode, comprising:
    inputting a predetermined amount of current to a CBoot_ pin which provides a bootstrap voltage, when a capacitor is coupled thereto and to an output of the regulator, for a first predetermined amount of time upon enabling an autodetect circuit by a regulator control circuit;
    determining whether a CBoot voltage measured at the CBoot_pin is substantially continuously above a predetermined CBoot voltage for a second predetermined amount of time and wherein the second predetermined amount of time is substantially less than the first predetermined amount of time; and
    if so, then switching the regulator to SMPS mode.

11. The method of claim 10, further comprising:
    if not, then operating the regulator in linear mode by detecting the CBoot_pin being shorted to ground.

12. The method of claim 11, further comprising:
    determining whether the CBoot voltage is substantially below the predetermined CBoot voltage substantially at the first predetermined amount of time; and
    if so, then operating the regulator in linear mode by detecting the CBoot_pin being shorted to ground.

13. The method of claim 12, further comprising:
    repeating the steps of inputting and determining upon an occurrence of an internal PUC signal and re-enabling the inputting of the predetermined current source to the CBoot_pin.

14. The method of claim 12, wherein, in determining, the predetermined CBoot voltage is approximately about 0.6 to 1.25 Volts.

15. The method of claim 12, wherein, in determining, the first predetermined amount of time is about 270 microseconds and the second predetermined amount of time is about 18 microseconds.

16. The method of claim 12, wherein, in putting, the predetermined current source is about one milliamp.

17. A regulator circuit comprising a switch mode power supply (SMPS) having a CBoost pin couplable to an external capacitor for providing a boosted drive voltage for switching transistors in the SMPS, and a linear regulator, the regulator circuit further comprising:
- a one-time mode selection circuit for operating the regulator circuit only as one of a SMPS or a linear regulator;
- a current source providing a current to the CBoost pin; and
- a circuit for measuring a voltage on the CBoost pin at a predetermined time for detecting the presence of the external capacitor and for signaling the one-time mode selection circuit to operate the regulator circuit only as an SMPS.

18. The regulator circuit of claim 17 wherein the current source is a current mirror circuit and the circuit for measuring is a comparator.

19. The regulator circuit of claim 17 wherein the current source provides a constant current into the CBoost pin for a first predetermined time and the circuit for measuring determines that voltage on the CBoost pin is substantially above a predetermined voltage for a second predetermined time.

20. The regulator circuit of claim 19 wherein the current source is a current mirror circuit and the circuit for measuring is a comparator.

* * * * *